(12) United States Patent
Borsini et al.

(10) Patent No.: US 7,065,661 B2
(45) Date of Patent: Jun. 20, 2006

(54) USING REQUEST AND GRANT SIGNALS TO READ REVISION INFORMATION FROM AN ADAPTER BOARD THAT INTERFACES A DISK DRIVE

(75) Inventors: Matthew Borsini, Worcester, MA (US); Douglas E. Peeke, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 503 days.

(21) Appl. No.: 10/320,019

(22) Filed: Dec. 16, 2002

(65) Prior Publication Data

US 2004/0117545 A1 Jun. 17, 2004

(51) Int. Cl.
*G06F 1/26* (2006.01)
(52) U.S. Cl. ..................... 713/300; 713/310
(58) Field of Classification Search ............... 713/300, 713/310, 324; 710/16, 68
See application file for complete search history.

(56) References Cited

U.S. PATENT DOCUMENTS

| | | | |
|---|---|---|---|
| 5,276,445 A | 1/1994 | Mita et al. | |
| 5,603,056 A | 2/1997 | Totani | |
| 5,673,132 A | 9/1997 | Carbone, Jr. et al. | |
| 5,841,997 A | 11/1998 | Bleiweiss et al. | |
| 5,890,214 A | 3/1999 | Espy et al. | |
| 5,901,151 A | 5/1999 | Bleiweiss et al. | |
| 5,920,733 A * | 7/1999 | Rao | 710/68 |
| 5,940,586 A * | 8/1999 | Bealkowski et al. | 714/5 |
| 5,960,180 A * | 9/1999 | Gates | 710/310 |
| 5,996,027 A | 11/1999 | Volk et al. | |
| 6,209,060 B1 | 3/2001 | Machida | |
| 6,317,800 B1 | 11/2001 | Westby et al. | |
| 6,421,711 B1 | 7/2002 | Blumenau et al. | |
| 6,425,049 B1 | 7/2002 | Yamamoto et al. | |
| 6,430,714 B1 | 8/2002 | McAdam et al. | |
| 6,434,498 B1 | 8/2002 | Ulrich et al. | |
| 6,449,725 B1 * | 9/2002 | Deenadhayalan et al. | 713/324 |
| 6,473,301 B1 | 10/2002 | Levy et al. | |
| 6,809,505 B1 * | 10/2004 | Peeke et al. | 324/66 |
| 6,829,658 B1 * | 12/2004 | Beauchamp et al. | 710/16 |
| 6,850,410 B1 * | 2/2005 | Peeke et al. | 361/685 |
| 6,904,497 B1 * | 6/2005 | Beckett | 711/114 |
| 2002/0044562 A1 | 4/2002 | Killen, Jr. et al. | |
| 2002/0046276 A1 | 4/2002 | Coffey et al. | |
| 2003/0093721 A1 * | 5/2003 | King et al. | 714/42 |

FOREIGN PATENT DOCUMENTS

JP 2001-75838 * 3/2001

* cited by examiner

*Primary Examiner*—Chun Cao
(74) *Attorney, Agent, or Firm*—Guerin & Rodriguez, LLP; Michael A. Rodriguez (57) ABSTRACT

Described are a system and method for reading revision information from an adapter board that interfaces a disk drive using request and grant signals. An adapter board is in electrical communication with a disk drive and with a control board. The adapter board has a controller with memory for storing data, with a request input terminal for receiving a request signal from the control board requesting access to a disk drive, with a grant output terminal for transmitting a grant signal to the control board granting access to the disk drive, and with a power down input terminal for receiving a power down signal to turn off power to the disk drive. The controller enters a read mode of operation in response to receiving a power down signal on the power down input terminal to enable the data stored in the memory to be read.

26 Claims, 5 Drawing Sheets

USING REQUEST AND GRANT SIGNALS TO READ REVISION INFORMATION FROM AN ADAPTER BOARD THAT INTERFACES A DISK DRIVE

FIELD OF THE INVENTION

The invention relates generally to storage systems. More particularly, the invention relates to a system and method of reading information from an interface to a disk drive in a storage system using signals primarily designed to establish communications with the disk drive.

BACKGROUND

Figure 1:
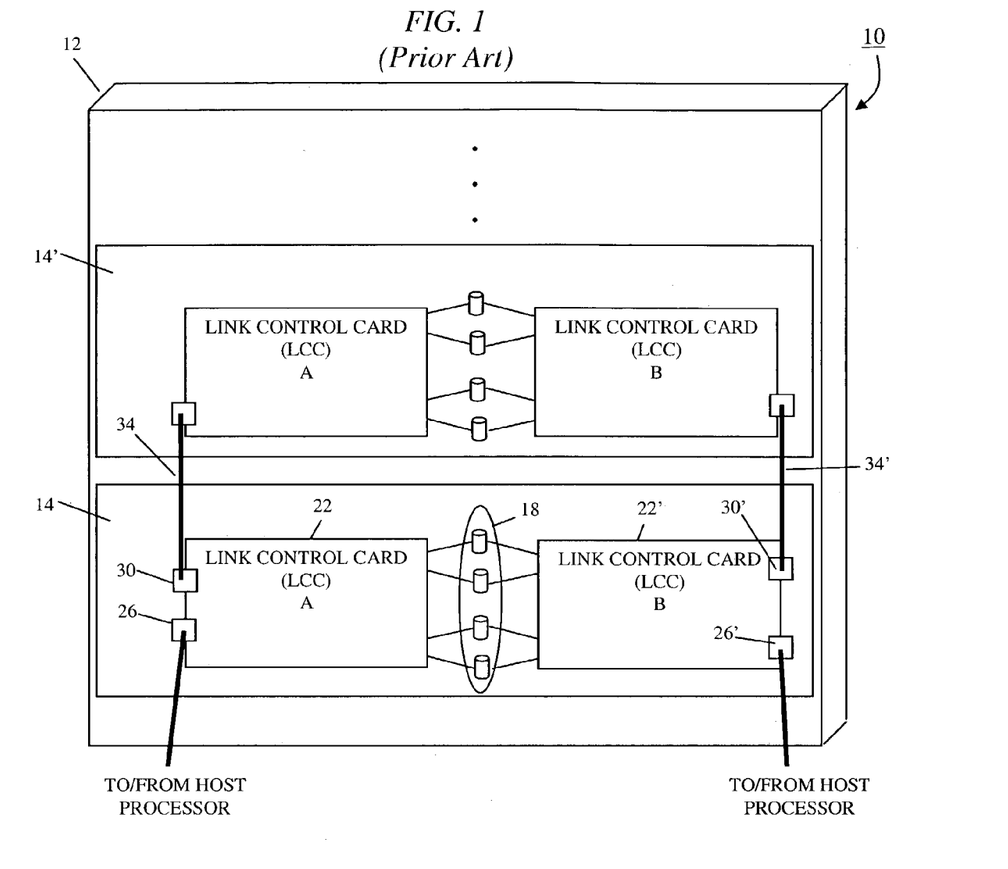
FIG. 1 is a diagram showing an example of a storage system including a plurality of enclosures connected in a Fibre Channel (FC) arbitrated loop.

Referring to FIG. 1, a typical storage system 10 includes at least one rack 12 of storage devices or enclosures 14, 14'. The storage system 10 can have fewer or more enclosures than those shown (internal or external to the rack 12). In general, the enclosure 14 is a storage device having a plurality of disk modules 18. Examples of storage devices include disk-array enclosures (DAE) and disk-array processor enclosures (DPE). A typical DAE includes a plurality of disk modules (e.g., fifteen), one or two link control cards (LCCs), and one or two power supplies. A typical DPE includes a plurality of disk modules (e.g., fifteen), one or two storage processors, one or two LCCs, and one or two power supplies. Disk modules 18 include a carrier assembly that holds a disk drive and slides into the enclosure 14.

Each enclosure 14, 14' implements redundancy with an "A" side and a "B" side. In enclosure 14, for example, each side has a link control card (LCC) 22, 22' and a power supply (not shown). Reference numerals for the B side components are the same as corresponding components on the A side with the addition of a prime (') designation. Each LCC 22, 22' includes a primary communications port 26, 26' and an expansion communications port 30, 30'. The enclosures 14, 14' are connected to each other by cables 34, 34' in a loop topology. Communication signals traverse the loop in one direction and pass from enclosure 14 to enclosure 14', in a daisy-chain fashion, and then return from enclosure 14' to enclosure 14. An enclosure receiving communication signals targeted for another enclosure forward those signals along the loop.

A common implementation of the loop is a Fibre Channel (FC) arbitrated loop. Fibre Channel is a computer communications protocol for communicating signals at a data rate of up to 2 Gbps. In general, the Fibre Channel protocol provides an interface by which host processors (and servers) communicate with the enclosures 14 and with the disk modules 18 installed within the enclosures 14. Typically, the disk modules 18 have Fibre Channel disk drives.

Figure 2:
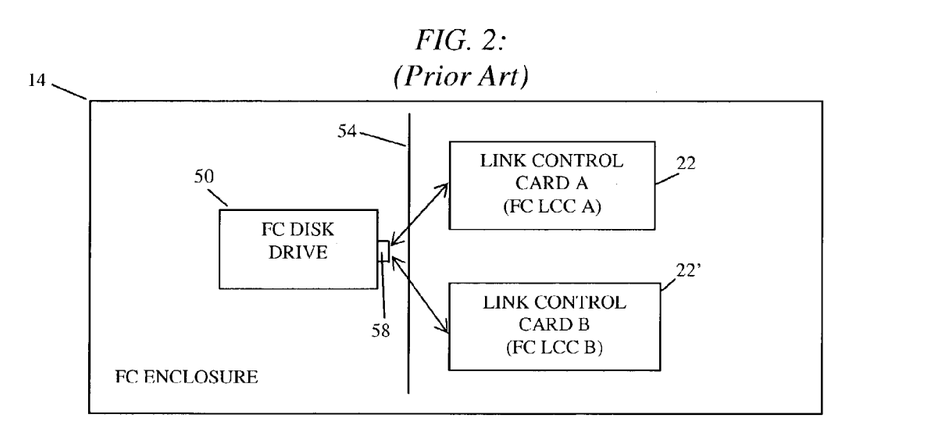
FIG. 2 is a diagram showing an example of an FC enclosure including a FC disk drive.

FIG. 2 shows a typical FC enclosure 14 having an FC disk drive 50, the A-side FC LCC 22 and the B-side FC LCC 22' of FIG. 1. The FC disk drive 50 has two ports (dual port); that is, communications with the disk drive 50 can occur over either port. The FC disk drive 50 is electrically connected to a midplane 54 by a midplane connector 58. The FC LCCs 22, 22' are also electrically connected to the midplane 54. One FC LCC 22 is in electrical communication with the disk drive 50 by way of one port, and the other FC LCC 22' is in electrical communication with the FC disk drive 50 by way of the other port.

Disk drive manufacturers have for many years produced another type of disk drive, called Advanced Technology Attachment (ATA) drives, for the personal computer (PC) industry. To satisfy the high volumes and the small profit margins of personal computers, the disk drive manufacturers have refined their processes so as to improve the reliability and storage capacity of the ATA drives, while driving down their cost. Consequently, ATA disk drives present an attractive alternative to FC disk drives for storage system developers and have found their way into storage systems.

To use ATA disk drives in the type of storage system described above requires some adaptations. For one, ATA disk drives are single ported, and therefore are not a direct substitute for the dual ported FC disk drives. To accommodate single port ATA disk drives, the storage industry devised an interface to provide the dual-port operation. Over time, the interface design and operation change to keep pace with revisions, for example, to the disk drive, improvements to the code running on the interface, and bug fixes. Also, at different times in the life of a storage system, some ATA disk drives can be installed with different versions of the interface, and others ATA disk drives can be replaced due to failure or upgrades.

Consequently, a storage system can have several ATA disk drives performing under the control of different revisions of software. Occasionally, when servicing a storage system for repair or for installing an upgrade, a serviceman desires to know the particular revisions of software running on the interfaces of the many disk drives in the system. Visually inspecting each disk drive interface to read the revision information or redesigning standardized equipment to achieve this purpose is neither practical nor cost effective.

SUMMARY

In one aspect, the invention features a storage system comprising a control board and an adapter board in electrical communication with a disk drive and with the control board. The adapter board includes a controller. The controller has memory for storing data, and a power down input terminal for receiving a power down signal that can cause power to the disk drive to be turned off. The controller enters a read mode of operation in response to receiving an asserted power down signal on the power down input terminal, to enable data stored in the memory of the controller to be read.

In another aspect, the invention features a method of reading information from a controller that is in electrical communication with a disk drive and a control board of a storage system. An asserted power down signal is received from the control board and, in response to the power down signal, entering a read mode of operation for reading data stored in the controller.

The invention features in another aspect a method of reading information from a controller that is in electrical communication with a disk drive and a control board of a storage system. An asserted power down signal and a de-asserted request signal are sent from the control board to the controller. A read mode of operation for reading data stored in the controller is entered in response to the asserted power down signal and de-asserted request signal.

In another aspect, the invention features a storage system, comprising a control board and means for providing an electrical interface between a disk drive and the control board. The electrical interface means has means for storing data and means for receiving a power down signal that can cause power to the disk drive to be turned off. The storage system also includes means for enabling the control board to read data stored by the means for storing in response to an asserted power down signal received by the means for receiving.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In brief overview, the present invention enables communication signals that have a primary use for requesting and granting access to a disk drive, to have a second use for causing data to be read from a device that arbitrates access to that disk drive. Although the invention is illustrated through the use of link control cards and Advanced Technology Attachment (ATA) disk drives (also called Integrated Drive Electronics or IDE drives), it is to be understood that the principles of the invention apply to any enclosure card or board which performs a logic or control function and communicates with the other cards or processors, and to other types of single port disk drives.

Figure 3:
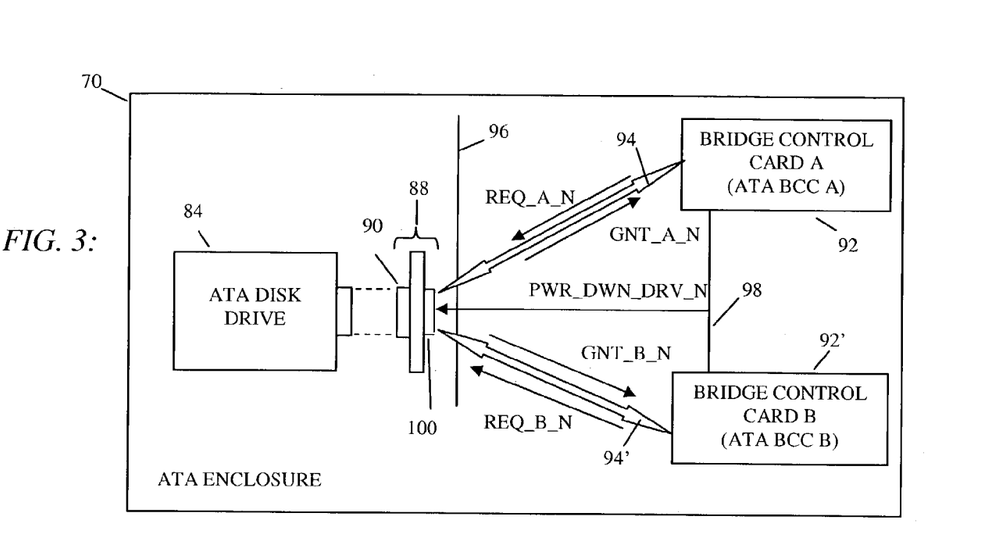
FIG. 3 is a diagram showing an embodiment of an Advanced Technology Attachment (ATA) enclosure constructed in accordance with the principles of the invention, the ATA enclosure having an ATA disk drive, an adapter board, and a plurality of ATA bridge control cards (ATA BCCs).

FIG. 3 shows an embodiment of an ATA enclosure 70 constructed in accordance with the principles of the invention. The ATA enclosure 70 includes an ATA disk drive 84, an adapter board 88, an A-side ATA bridge control card 92 and a B-side ATA bridge control card 92' (generally, ATA BCC 92). The ATA disk drive 84, which can be a parallel ATA (PATA) drive or a serial ATA (SATA) drive, is electrically connected to a disk drive connector 90 attached to one side of the adapter board 88, and the adapter board 88 is electrically connected to a midplane 96 by a midplane connector 100 attached to the other side of the adapter board 88.

In one embodiment, the adapter board 88 and the FC disk drive 50 (FIG. 2) use the same type of midplane connector and connect to the same type of midplane. More specifically, the midplane connector 100 and the midplane connector 58 (FIG. 2) for the FC disk drive 50 have the same number of contacts and contact configuration. Also, the midplane 54 (FIG. 2) and the midplane 100 are the same, i.e., the same set of midplane signals is used, although used differently, by the ATA enclosure 70 and FC enclosure 14. (The different uses of the same midplane signals are described in U.S. Pat. No. 6,829,658, issued on Dec. 7, 2004 to Beauchamp et at., titled "Compatible Signal-To-Pin Connector Assignments For Usage With Fibre Channel And Advanced Technology Attachment Disk Drives", and incorporated by reference herein in its entirety.) Thus, the adapter board 88 is physically and electrically compatible with the FC disk drive 50 (FIG. 2); that is, the ATA disk drive 84, by means of the adapter board 88, can be mechanically plugged into the same slot of an enclosure as the FC disk drive 50.

Each ATA BCC 92, in general, operates as a communications bridge between the FC arbitrated loop and the ATA disk drive 84. Each ATA BCC 92 is in electrical communication with the midplane connector 100 through the midplane 96 over a plurality of signal lines 94, 94', 98. The ATA BCC A 92 communicates with the adapter board 88 over signal lines 94, the ATA BCC B 92' over signal lines 94', and both ATA BCCs 92, 92' over signal line 98.

The ATA disk drive 84 is a single port device, and thus for each ATA BCC 92 to communicate with the disk module 84, that ATA BCC 92 issues a request signal to the adapter board 88 and expects to receive a grant signal from the adapter board 88 in reply. The adapter board 88 converts the single port of the ATA disk drive 84 into a dual port disk module, with the adapter board 88 arbitrating which of the ATA BCCs 92, 92' can currently communicate with the ATA disk drive 84 through the use of the request and grant signals.

FIG. 3 also shows the exchange of request signals and grant signals (REQ_A_N and GNT_A_N) between the adapter board 88 and ATA BCC A 92 over signal lines 94 and of request signals and grant signals (REQ_B_N and GNT_B_N) between the adapter board 88 and ATA BCC B 92' over signal lines 94'. Also, each ATA BCC 92 can also send a power down signal (PWR_DWN_DRV_N) to the adapter board 88 over signal line 98 that (1) instructs the adapter board 88 to power down the disk drive 84, or (2) causes the adapter board 88 to enter a read mode of operation in accordance with the principles of the invention (described in more detail below). In general, the "_N" portion of a signal name indicates that the signal is asserted when in a low state and de-asserted when in a high state. In an alternate embodiment, asserting a signal involves placing the signal into a high state and de-asserting a signal involves placing the signal into a low state.

Figure 4:
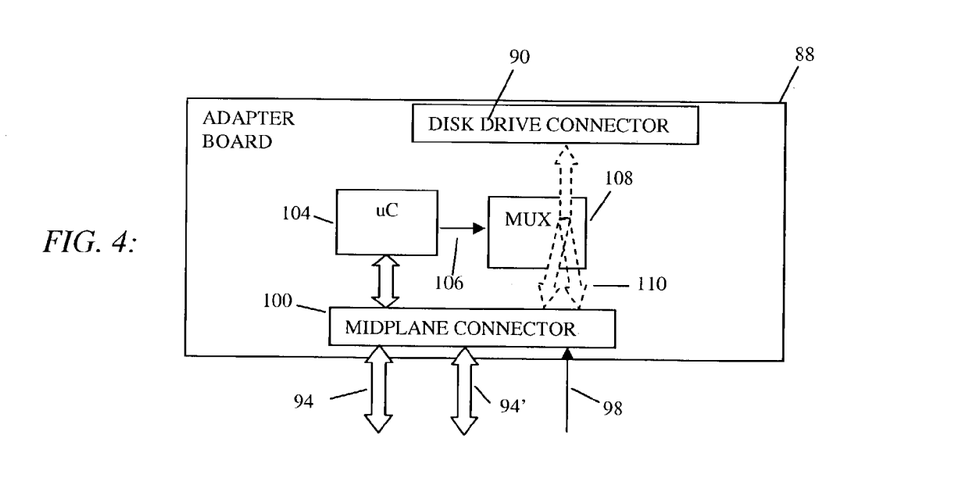
FIG. 4 is a diagram showing an embodiment of the adapter board shown in FIG. 3 and the communication signals used by ATA BCCs to establish communications with the ATA disk drives.

FIG. 4 shows a simplified embodiment of the adapter board 88 including a programmable integrated circuit or microcontroller (uC) 104 (hereafter, controller 104), a multiplexer (MUX) 108, the disk drive connector 90, and the midplane connector 100. In general, the controller 104 is an electronic component such as an ASIC (application specific integrated circuit) and PLD (programmable logic device). The controller 104 has a request signal input terminal for each ATA BCC 92 for receiving request signals from that ATA BCC 92 and a grant signal output terminal for each ATA BCC 92 for sending grant signals (or data bits) to that ATA BCC 92. The controller 104 also includes non-volatile memory for storing information, such as data and software code. One example of stored information is the revision number of the adapter board 88 (or of the software code on the adapter board 88).

The controller 104 is in electrical communication with the MUX 108 by signal line 106, and through the MUX 108 the controller 104 controls which ATA BCC 92, 92' communicates with the ATA disk drive 84. Under the control of the controller 104, the MUX 108 enables a communication path between one of the ATA BCCs 92, 92' and the disk drive 84. (The forked dashed arrow 110 passing through the MUX 108 indicates that the MUX 108 operates as a switch that enables or disables communication between each of the ATA BCCs 92 and the disk drive 84.)

The controller 104 is also in electrical communication with the midplane connector 100 for receiving power down and request signals from and for transmitting grant signals to the ATA BCCs 92, 92'. Under certain signal conditions, the controller 104 interprets an asserted power down signal from either of the ATA BCCs 92, 92' as a request to enter a read mode of operation, and then uses the request and grant signals to execute a serial read transaction that reads information from the controller memory, as described in more detail below. (When the disk drive 84 is inactive, the request and grant signals that are generally used to gain access to the disk drive 84 are now available for another purpose, e.g., the read transaction.) Upon entering the read mode of operation, the controller 104 operates like a serial memory device: the request signal terminal operates as a clock input which receives clock signals from the ATA BCC 92, and the grant signal terminal operates as a data-out line upon which the controller 104 serially sends data to the ATA BCC 92 in response to each received clock signal.

Figure 5:
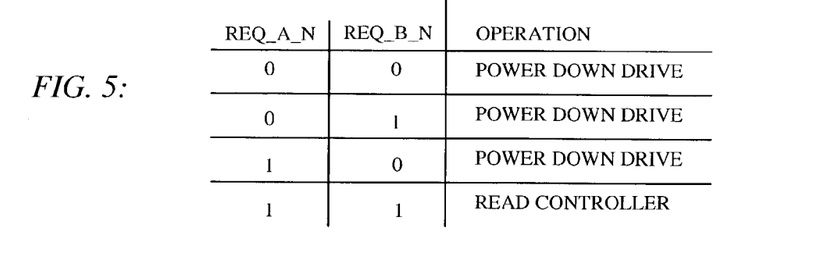
FIG. 5 is an example of a truth table identifying the signal states required for performing the read transaction of the present invention.

FIG. 5 shows an embodiment of a truth table illustrating storage system operation when the controller 104 (FIG. 4) receives an asserted power down signal. The operation performed depends upon the present states of the request signal lines. In general, an asserted power down signal alone does not result in powering down the disk drive 84 (to avoid powering down the disk drive 84 during a read transaction). To power down the disk drive 84, an ATA BCC 92 (FIG. 4) must assert both the power down signal and its request signal. Accordingly, if either or both of the request signal lines are asserted (i.e., low), when the controller 104 receives the asserted power down signal, the disk drive 84 powers down. If, at the moment of receiving the asserted power down signal, both of the request signal lines are de-asserted (i.e., high), the controller 104 enters a read mode of operation, and the disk drive 84 does not power down. One of the ATA BCCs 92 can then read information from the controller 104, as described below.

Embodiments of enclosures having only one ATA BCC 92 can also practice the invention. For such embodiments, when the controller 104 receives the asserted power down signal, the controller 104 enters the read mode of operation if the sole request signal line is de-asserted. Alternatively, the controller 104 causes the disk drive 84 to power down if the request signal line is asserted when the power down signal is received.

Figure 6:
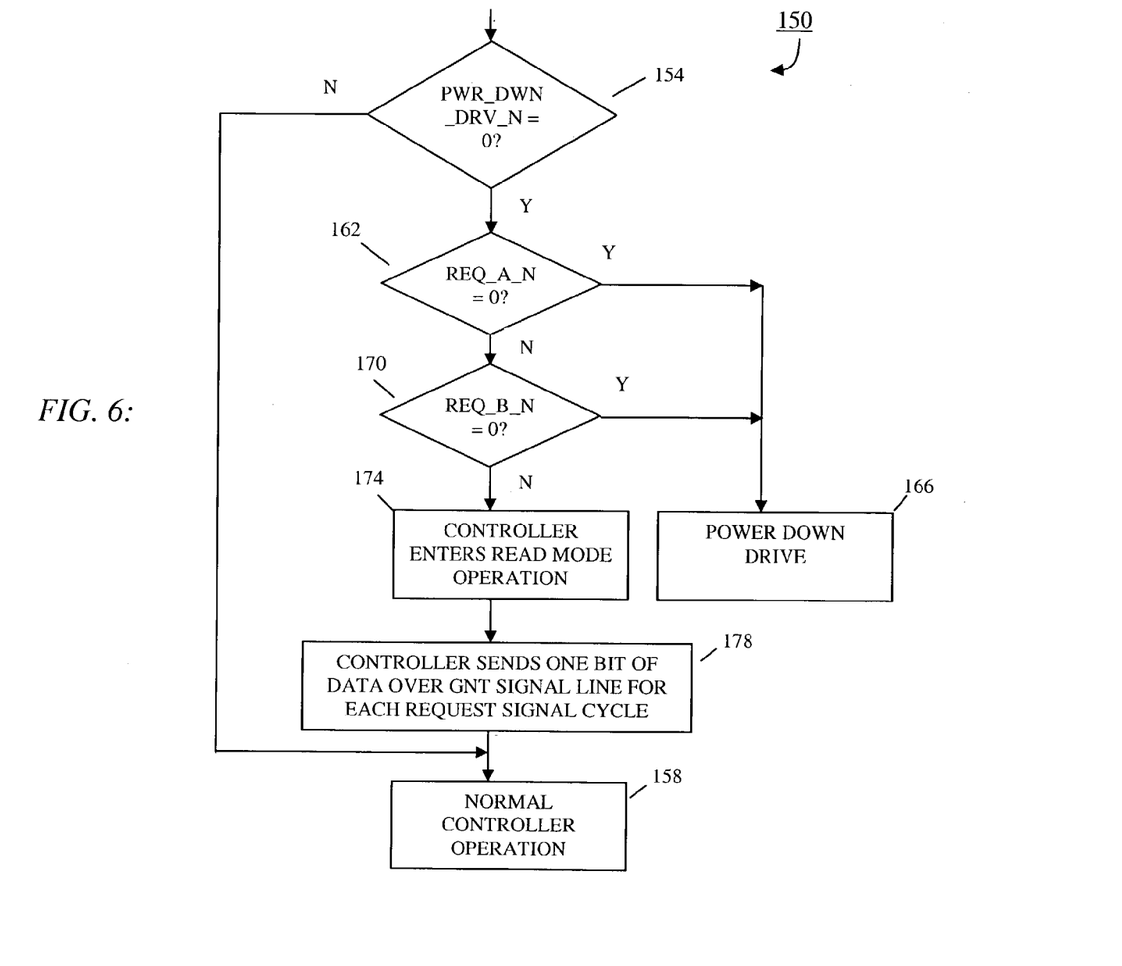
FIG. 6 is a flow chart showing an embodiment of a process performed by a programmable interface circuit or microcontroller for entering a read mode of operation in accordance with the present invention.

FIG. 6 shows an embodiment of a process 150 performed by the controller 104 to determine whether the power down signal and request signal(s) cause the controller 104 to enter the read mode. The process 150 can be implemented in hardware or software. At step 154, the controller 104 determines if an ATA BCC 92 has asserted the power down signal. If the power down signal is not asserted, the controller 104 continues (step 158) with normal operation, e.g., arbitrating between ATA BCCs 92, 92' for access to the disk drive 84.

When the power down signal is asserted, the controller 104 determines (step 162) whether the ATA BCC A 92 has asserted the request signal (REQ_A_N). If so, the disk drive 84 powers down (step 166). Otherwise, the controller 104 then determines (step 170) whether the ATA BCC B 92' has asserted its request signal (REQ_B_N). The disk drive 84 powers down (step 166) if the request B signal is asserted. If the request B signal is not asserted, the controller 104 enters (step 174) the read mode of operation. The ATA BCC 92 that asserted the power down signal reads data from the controller 104 by cycling the request signal. The controller 104 retrieves (step 178) the data from the memory and, in serial fashion, sends the data to the ATA BCC 92 over the grant signal line, sending one bit of data for each cycle of the request signal. In another embodiment, the controller 104 transmits more than one bit of data per clock cycle to the ATA BCC 92 in serial over the grant signal line. The principles of the invention also apply to embodiments in which the controller 104 transmits more than one bit of data per clock cycle in parallel (i.e., over multiple signal lines that pass to the ATA BCC 92, including or excluding use of the grant signal line).

After the read operation completes, the controller 104 returns to normal operation (step 158). In one embodiment, the controller 104 implements a "watch dog" timer to mark the end of the read transaction in the event the ATA BCC 92 does not complete the transaction. When the timer expires, the controller 104 can power down the disk drive 84. When the power down signal becomes de-asserted, the controller 104 can power up the disk drive 84.

Another embodiment of the process 150 performs steps 158 and 162 simultaneously and still another embodiment performs step 162 before step 158. For enclosures having only one ATA BCC 92, the adapter board 88 ensures that the request signal of the absent ATA BCC is not asserted.

Figure 7:
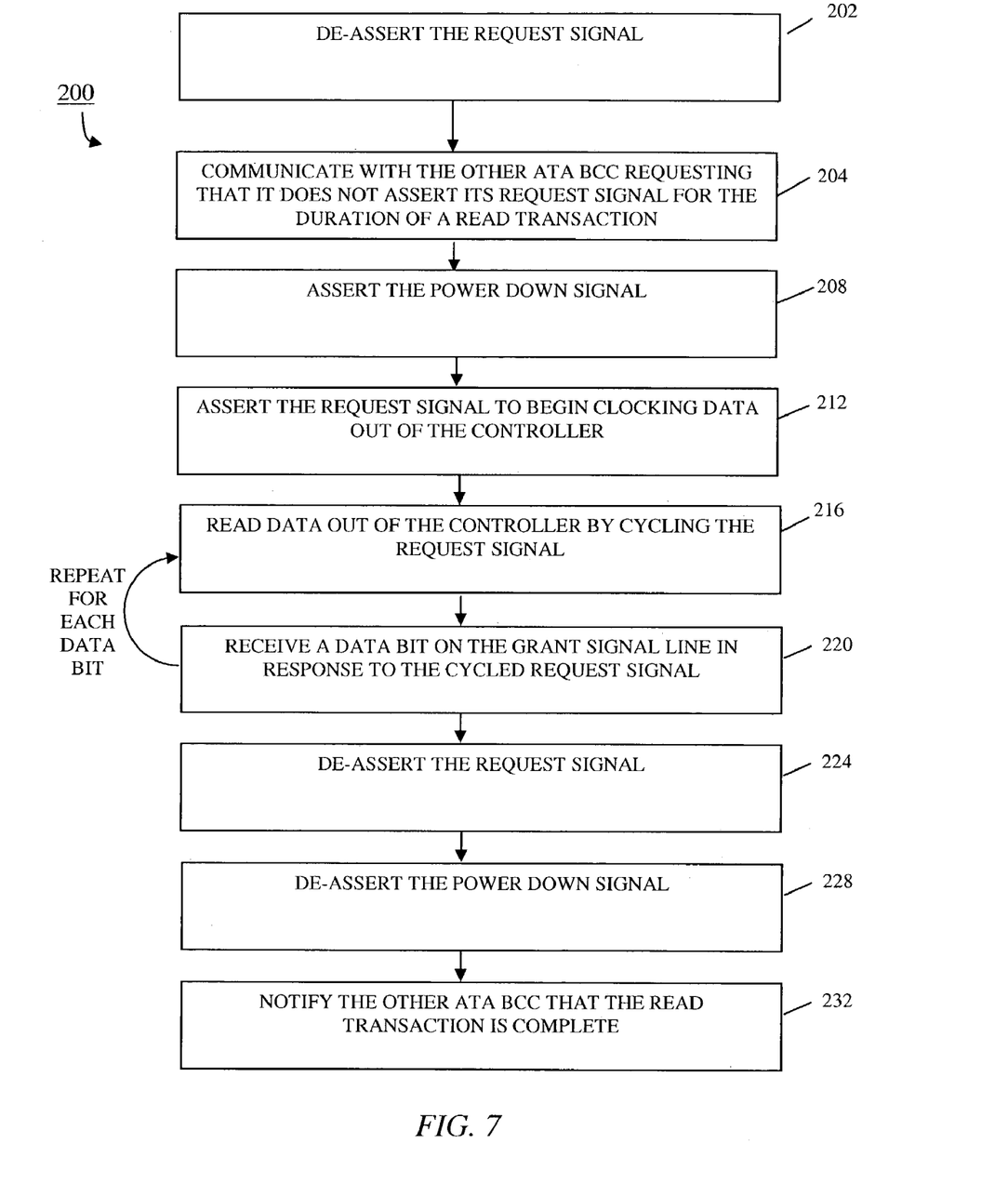
FIG. 7 is a flow chart showing an embodiment of a process performed by an ATA BCC for reading information from the microcontroller of the present invention.

FIG. 7 shows an embodiment of a process 200 performed by an ATA BCC 92 seeking to perform a read transaction with the controller 104. For the sake of illustration, ATA BCC 92 is the BCC to read information from the controller 104. At step 202, the ATA BCC 92 de-asserts its request signal. The ATA BCC 92 then communicates (step 204) with the other ATA BCC 92', requesting that the other ATA BCC 92' not assert its request signal until after the read transaction completes. If the other ATA BCC 92' were to assert its request signal during the read transaction, the controller 104 would stop sending data and the disk drive 84 would immediately power off.

At step 208, the ATA BCC 92 seeking to perform a read transaction asserts the power down signal. Under the signal conditions described above, the controller 104 enters the read mode of operation.

After waiting for a period of time (e.g., at least 100 us), the ATA BCC 92 then asserts (step 212) its request signal to begin clocking data out of the controller 104. The minimum waiting period allows the micro controller to set up for the read operation. The ATA BCC 92 then reads (step 216) data from the controller 104 by cycling the request signal (i.e., de-asserts and asserts). In response to the cycled request signal, the ATA BCC 92 receives (step 220) a bit of data on the grant signal line. Steps 216 and 220 repeat for each bit of data that is to be read from the controller 104.

In one embodiment, the read transaction comprises reading revision information from the memory of the controller 104. The revision information includes a revision number and a end-of-transaction bit pattern. The revision number is represented by eight bits. One of the eight bits (e.g., the most significant bit) is a parity bit that enables the ATA BCC 92 to verify that the data received from the controller 104 are correct. In one embodiment, the parity bit reflects odd parity.

If, excluding the parity bit, the revision information has an even number of "1" bits, the parity bit has a value of "1" so that the complete revision information has an odd number of "1" bits. If, excluding the parity bit, the complete revision information has an odd number of "1" bits, the parity bit has a value of "0" so that the revision information has an odd number of "1" bits.

The other seven bits of the revision number represent the value of the revision number (i.e., 0 through 127). The end-of-transaction bit pattern comprises two bits which are used to indicate if the read transaction occurred. The two bits have opposite data values (i.e., "0" and "1") so that a malfunctioning controller 104 cannot accidentally produce the end-of-transaction bit pattern; that is, if the controller 104 is not functioning, it is likely that both bits will have a high value or both will have a low value.

After cycling the request signal line for as many cycles as are needed to read the full revision information, the ATA BCC 92 de-asserts (step 224) the request signal and holds the signal in this state. To end the read transaction the ATA BCC 92 de-asserts (step 228) the power down signal. Then the ATA BCC 92 notifies (step 232) the other ATA BCC 92' that the read transaction is complete. Optionally, the other ATA BCC 92' can implement a "watch dog" timer to mark the end of the read transaction in the event the ATA BCC 92 performing the read does not send the completion notification. The timer prevents the other ATA BCC 92' from waiting indefinitely if the ATA BCC 92 malfunctions during a revision read. When the timer expires, the other ATA BCC 92' asserts the request signal to end the read transaction and to cause the disk drive 84 to power down (if the power down signal is still asserted). If the ATA BCC 92 de-asserted the power down signal, the other ATA BCC 92' has normal access to the disk drive 84.

If the ATA BCC 92 requires the disk drive to be powered down during the reading of the revision information, it can de-assert the power down signal to end the read transaction and then assert both the request and power down signals. As shown in the truth table of FIG. 5, this signal combination results in powering down the disk drive 84.

Figure 8:
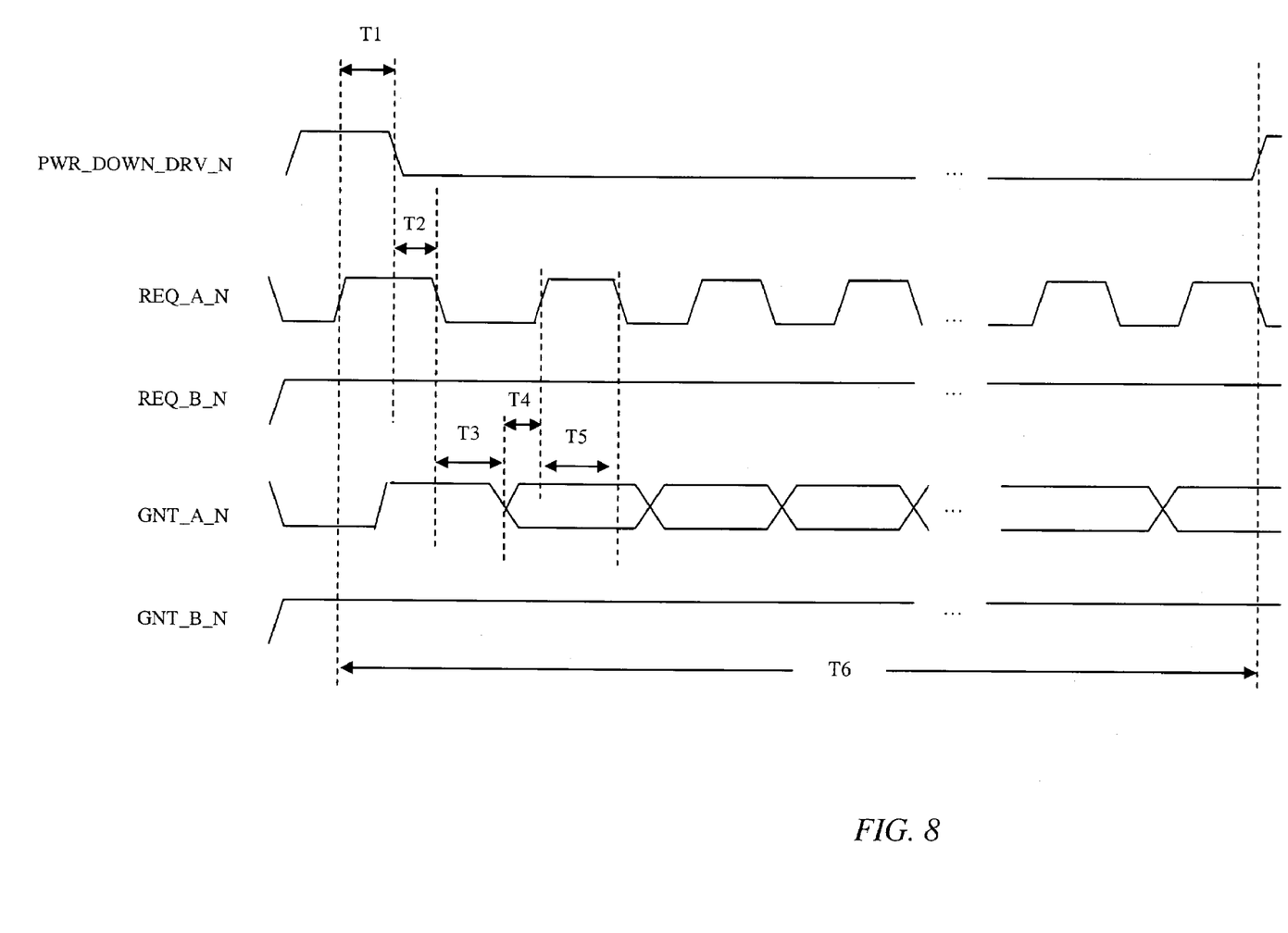
FIG. 8 is a timing diagram for the signals used to read information from the adapter board in accordance with the principles of the invention.

FIG. 8 shows a timing diagram of the signals used by each ATA BCC 92 and the controller 104 to perform a read transaction. The timing diagram includes six timing parameters, T1, T2, T3, T4, T5, and T6. The timing parameter T1 is a period measured from the rising edge of the last de-asserted request signal (here, REQ_A_N) to when the power down signal (PWR_DOWN_DRIVE_N) becomes asserted. This parameter represents the minimum waiting period for the asserted power down signal to be interpreted by the controller 104 as a request to enter the read mode. Asserting the power down signal before the waiting period expires can cause the controller 104 to interpret the asserted power down signal as a power down request and not as a read mode request.

The timing parameter T2 is a period measured from the asserting edge of the power down signal to the asserting edge of the request signal (here, REQ_A_N). Asserting the request signal before the waiting period expires can cause the controller 104 to interpret the asserted power down signal as a power down request and not as a read mode request.

The timing parameter T3 is a period measured from the asserting edge of the request signal (here, REQ_A_N) and when valid data appears on the corresponding grant signal line (here, GNT_A_N). The timing parameter T4 is a period measured from when valid data appears on the grant signal line and when the corresponding request signal (here, REQ_A_N) is de-asserted. The timing parameter T5 is a period measured from the de-asserting edge of the request signal to the next asserting edge of the request signal. Timing parameters T3, T4, and T5 repeat for each bit read. The timing parameter T6 is a period measured from the first rising edge of the request signal that initiated the read transaction to the de-asserting edge of the power down signal. This period represents the maximum amount of time that the reading ATA BCC 92 has to complete the read transaction.

With reference to FIG. 8, Table 1 below shows one example of timing specifications of the timing parameters T1, T2, T3, T4, T5, and T6, used to perform the read transaction.

TABLE 1

| Timing Parameter | Minimum Time | Maximum Time | Units | Description |
|---|---|---|---|---|
| T1 | 0 | | | Period after both request signals are de-asserted that the power down signal may be asserted. |
| T2 | 100 | | us | Minimum period after asserting power down signal before request signal may be asserted. |
| T3 | 5 | 40 | us | Maximum period after asserting the request signal before data is valid. |
| T4 | 0 | | | Minimum period after data is valid before the rising edge of the request signal. |
| T5 | 15 | | us | Minimum period for valid data. |
| T6 | | 50 | ms | Overall period for completing read transaction. |

While the invention has been shown and described with reference to specific preferred embodiments, it should be understood by those skilled in the art that various changes in form and detail may be made therein without departing from the spirit and scope of the invention as defined by the following claims.

What is claimed is:

1. A storage system having a disk drive, the storage system comprising:
    a control board asserting a power down signal capable of causing power to the disk drive to be turned off; and
    an adapter board in an electrical communication path between the disk drive and the control board to receive the power down signal, the adapter board including a controller, the controller having memory for storing data and a power down input terminal that receives the power down signal, the asserted power down signal causing the controller to enter a read mode of operation so that data stored in the memory of the controller can be read, instead of causing power to the disk drive to be turned off.

2. The storage system of claim 1, wherein the controller further comprises a request input terminal for receiving a request signal from the control board when the control board requests access to the disk drive, the controller entering the read mode of operation if the request signal is de-asserted on the request input terminal when the controller receives the asserted power down signal on the power down signal terminal.

3. The storage system of claim 1, wherein the control board is a first control board, the storage system comprises a second control board, and the controller comprises a first request input terminal for receiving a request signal from the first control board when the control board requests access to the disk drive and a second request input terminal for receiving a request signal from the second control board when the second control board requests access to the disk drive, the controller entering the read mode of operation if the request signals on the first and second request input terminals are both de-asserted when the controller receives the asserted power down signal on the power down signal terminal.

4. The storage system of claim 1, wherein the disk drive is an ATA (Advanced Technology Attachment) disk drive.

5. The storage system of claim 1, further comprising a second control board in electrical communication with the other control board and with the adapter board, wherein a first one of the control boards notifies the other of the control boards that the first one of the control boards is initiating a read transaction with the adapter board.

6. The storage system of claim 5, wherein the control board receiving the notification includes a timer which starts timing upon receiving the notification.

7. The storage system of claim 1, wherein the controller includes a timer for keeping time during an expiration period, the timer starting when the controller receives the power down signal and the controller powering down the disk drive if the expiration period expires.

8. The storage system of claim 1, wherein the controller further comprises a request input terminal for receiving a request signal from the control board when the control board requests access to the disk drive, the request input terminal operating as a clock input terminal for receiving clock signals from the control board when the controller is operating in the read mode of operation.

9. The storage system of claim 1, wherein the controller further comprises a grant output terminal for transmitting a grant signal to the control board when granting the control board access to the disk drive, the grant output terminal operating as a data output terminal for providing data to the control board when the controller is operating in the read mode of operation.

10. The storage system of claim 1, wherein the controller further comprises a request input terminal for receiving a request signal from the control board when the control board requests access to the disk drive and a grant output terminal for transmitting a grant signal to the control board when granting the control board access to the disk drive, the controller placing one bit of data stored in the memory onto the grant output terminal for each request signal cycle received from the control board on the request input terminal.

11. The system of claim 1, wherein the data stored in the memory of the controller includes revision information.

12. In a storage system having a control board, a disk drive, and a controller in an electrical communication path between the disk drive and the control board, a method of reading information from the controller, the method comprising:
    receiving, at the controller, an asserted power down signal from the control board; and
    entering a read mode of operation for reading data stored in the controller in response to the asserted power down signal, instead of turning off power to the disk drive.

13. The method of claim 12, further comprising evaluating a state of each request signal input line in response to the power down signal, wherein the step of entering the read mode of operation occurs if each request signal input line is de-asserted when the power down signal is received.

14. The method of claim 12, further comprising receiving an asserted request signal on a request signal input line, and accessing data stored in memory in response to the request signal while operating in the read mode.

15. The method of claim 12, further comprising placing data retrieved from memory onto a grant output terminal in response to an asserted request signal received from the control board on a request input terminal while operating in the read mode.

16. The method of claim 12, further comprising turning off power to the disk drive when a predetermined period elapses after entering the read mode of operation.

17. The method of claim 12, wherein the data stored in the controller includes revision information.

18. In a storage system having a control board, a disk drive, and a controller in electrical communication with the disk drive and the control board, a method of reading information from the controller, the method comprising:
    sending an asserted power down signal from the control board to the controller;
    sending a de-asserted request signal from the control board to the controller; and
    entering a read mode of operation for reading data stored in the controller in response to the asserted power down signal and to the de-asserted request signal.

19. The method of claim 18, further comprising sending an asserted request signal from the control board to the controller while operating in the read mode to prompt the controller to access data stored in memory in response to the asserted request signal.

20. The method of claim 19, further comprising receiving data from the controller on a grant signal line in response to the asserted request signal while operating in the read mode.

21. The method of claim 18, further comprising sending a plurality of request signal cycles from the control board to the controller, and receiving data from the controller on a grant signal line for each sent request signal cycle while operating in the read mode.

22. The method of claim 18, wherein the data to be read from the controller includes revision information.

23. The method of claim 18, further comprising sending a de-asserted power down signal from the control board to the controller to terminate the read mode of operation.

24. The method of claim 18, wherein the control board is a first control board, and further comprising notifying a second control board by the first control board that the first control board is initiating a read transaction with the controller.

25. The method of claim 24, further comprising sending an asserted power down signal from the second control board to the controller to turn off power to the disk drive when a predetermined period elapses after receiving the notification.

26. A storage system, comprising:
    a disk drive;
    a control board asserting a power down signal capable of causing power to the disk drive to be turned off;
    an electrical interface between a disk drive and the control board, the electrical interface having means for storing data and means for receiving the asserted power down signal from the control board; and
    means for enabling the control board to read data stored by the means for storing in response to the asserted power down signal received by the means for receiving, instead of turning off power to the disk drive.

* * * * *